(12) United States Patent
Wadsworth

(10) Patent No.: US 11,712,860 B2
(45) Date of Patent: *Aug. 1, 2023

(54) LIGHTNING STRIKE PROTECTION SURFACER AND METHOD OF MANUFACTURING THE SAME

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/989,931

(22) Filed: Nov. 18, 2022

(65) Prior Publication Data

US 2023/0086362 A1 Mar. 23, 2023

Related U.S. Application Data

(63) Continuation of application No. 16/905,318, filed on Jun. 18, 2020, now Pat. No. 11,504,925.

(51) Int. Cl.
*B29C 70/02* (2006.01)
*B29C 70/68* (2006.01)
(Continued)

(52) U.S. Cl.
CPC .......... *B29C 70/688* (2013.01); *B29C 70/02* (2013.01); *B32B 5/022* (2013.01); *B32B 5/26* (2013.01);
(Continued)

(58) Field of Classification Search
CPC ........ B29C 35/0805; B29C 2035/0822; B29C 70/02; B29C 70/025; B29C 70/12;
(Continued)

(56) References Cited

U.S. PATENT DOCUMENTS 5,370,921 A * 12/1994 Cedarleaf ............... B32B 15/20
442/13
6,485,589 B1 11/2002 Johnson et al.
(Continued)

FOREIGN PATENT DOCUMENTS

WO 2018063970 4/2018
WO 2019018754 1/2019

*Primary Examiner* — Michael A Tolin
(74) *Attorney, Agent, or Firm* — Hovey Williams LLP (57) ABSTRACT

A thermoplastic surfacer for providing lightning strike protection to a composite component of an aircraft, methods of manufacturing the surfacer, and methods of applying the surfacer to a composite part. The thermoplastic surfacer includes a broadgood having a thermoplastic resin, one or more fillers embedded into the broadgood, and a lightning strike protection mesh or foil embedded into the broadgood. When applying the surfacer to a composite part of an aircraft, the method includes draping the surfacer on an at least partially unconsolidated composite part, consolidating the at least partially unconsolidated composite part by heating the part to a temperature at or above a melt temperature of a resins used in the part and in the surfacer, and filling at least one surface defect in the consolidated part using the thermoplastic polymer resin and milled fibers provided in the thermoplastic surfacer.

20 Claims, 7 Drawing Sheets

(51) Int. Cl.
*B29K 705/02* (2006.01)
*B29K 705/10* (2006.01)
*B32B 15/02* (2006.01)
*B32B 15/14* (2006.01)
*B32B 15/16* (2006.01)
*B32B 27/20* (2006.01)
*B32B 5/02* (2006.01)
*B32B 5/26* (2006.01)
*B64D 45/02* (2006.01)
*B29L 31/30* (2006.01)
*B29K 101/12* (2006.01)
*B29K 301/12* (2006.01)
*B29C 35/08* (2006.01)

(52) U.S. Cl.
CPC .............. *B32B 15/14* (2013.01); *B32B 15/16* (2013.01); *B32B 27/20* (2013.01); *B64D 45/02* (2013.01); *B29C 2035/0822* (2013.01); *B29K 2101/12* (2013.01); *B29K 2301/12* (2013.01); *B29K 2705/02* (2013.01); *B29K 2705/10* (2013.01); *B29L 2031/3076* (2013.01); *B32B 15/02* (2013.01); *B32B 2262/101* (2013.01); *B32B 2262/103* (2013.01); *B32B 2262/106* (2013.01); *B32B 2264/104* (2013.01); *B32B 2264/108* (2013.01); *B32B 2264/1026* (2020.08); *B32B 2264/1027* (2020.08); *B32B 2264/1055* (2020.08); *B32B 2307/202* (2013.01); *B32B 2605/18* (2013.01)

(58) Field of Classification Search
CPC ... B29C 70/504; B29C 70/506; B29C 70/508; B29C 70/682; B29C 70/688; B29C 70/882; B29C 70/885; B29K 2101/12; B29K 2301/12; B29K 2307/04; B29K 2505/08; B29K 2507/04; B29K 2509/00; B29K 2509/02; B29K 2509/08; B29K 2509/10; B29K 2705/02; B29K 2705/10; B29L 2031/3076; B29L 2031/3082; B29L 2031/3085; B32B 3/266; B32B 5/022; B32B 5/16; B32B 5/24; B32B 5/26; B32B 5/265; B32B 5/266; B32B 15/02; B32B 15/08; B32B 15/14; B32B 15/16; B32B 15/20; B32B 27/12; B32B 27/20; B32B 27/281; B32B 27/285; B32B 27/286; B32B 27/288; B32B 27/302; B32B 27/365; B32B 2262/101; B32B 2262/103; B32B 2262/105; B32B 2262/106; B32B 2264/10; B32B 2264/101; B32B 2264/102; B32B 2264/1026; B32B 2264/1027; B32B 2264/104; B32B 2264/1055; B32B 2264/107; B32B 2264/108; B32B 2307/202; B32B 2307/206; B32B 2307/212; B32B 2311/12; B32B 2311/24; B32B 2605/18; B64D 45/02
See application file for complete search history.

(56) References Cited

U.S. PATENT DOCUMENTS

| | | | |
|---|---|---|---|
| 8,709,189 B2* | 4/2014 | Schaaf | B32B 5/024 |
| | | | 156/577 |
| 8,962,130 B2 | 2/2015 | Kruckenberg et al. | |
| 9,550,330 B2 | 1/2017 | Pratte et al. | |
| 9,623,984 B2* | 4/2017 | Steinwandel | B64D 45/02 |
| 9,676,961 B2* | 6/2017 | Sang | B32B 27/18 |
| 11,027,856 B2* | 6/2021 | Sang | B32B 15/088 |
| 11,504,925 B2* | 11/2022 | Wadsworth | B29C 70/885 |
| 2020/0307162 A1* | 10/2020 | Remy | B32B 5/022 |
| 2021/0367416 A1* | 11/2021 | Hebert | B32B 27/12 |

* cited by examiner

LIGHTNING STRIKE PROTECTION SURFACER AND METHOD OF MANUFACTURING THE SAME

CROSS-REFERENCE TO RELATED APPLICATIONS

This application is a continuation of and claims priority to U.S. application Ser. No. 16/905,318 filed on Jun. 18, 2020, now U.S. Pat. No. 11,504,925, and entitled "Lightning Strike Protection Surfacer and Method of Manufacturing the Same," which is incorporated by reference herein in its entirety.

BACKGROUND OF THE INVENTION

Composite parts of aircrafts or other vehicles are made from several layers, or plies, of fibers and resin, which are hardened or cured to maintain rigidity. These composite parts are relatively lightweight as compared to traditional metallic parts, while exhibiting similar or even improved strength and longevity properties. Thus, many aircraft components such as fuselages, wings, and other parts that traditionally were made of steel, aluminum, or other metal are now produced as composite parts. These composite parts may be formed using a thermoplastic polymer, which turns to liquid when heated and turns solid when cooled, or else using a thermoset polymer, which is a polymer that is pliable at room temperatures and thereafter cures when heated to elevated temperatures.

Unlike metal components, however, composite parts are not electrically conductive, and thus do not inherently provide adequate lighting strike protection. When fuselages or wings are made from aluminum, steel, or other metallic substances, the outer surface provides a highly conductive path such that, if the part is subject to a lightning strike during flight, the current passes from the entry point across the surface to an exit point without structurally damaging the aircraft. On the other hand, the materials used to form composite aircraft components such as, for example, carbon or graphite fibers combined with a thermoplastic or thermoset resin, are not electrically conductive and thus cannot, on their own, sufficiently pass current across the outer skin of the component.

Composite parts of aircraft in lightning strike zones are therefore provided with a lightning strike protection layer, which increases the conductivity of the outer surface of the composite part and enables the composite part to sufficiently absorb and pass current from a lightning strike across the outer surface of the part without structural damage to the part similar to the more traditional aluminum, steel, or other metallic components. The lightning strike protection layer may be a conductive metallic mesh or foil that is affixed to the outer surface of the composite part. If the part is thereafter subjected to a lightning strike, the current passes from the entry point to an exit point via the conductive mesh or foil eliminating structural damage to the aircraft part.

Often, composite parts are created using a thermoset resin, which is relatively pliable at normal manufacturing temperatures and which cures and hardens when heated to elevated temperatures. For such thermoset parts, adding lightning strike protection may include adding an outermost layer comprised of a thermoset resin and wire mesh or foil, and then heating the part to cure the thermoset resin thus bonding the wire mesh or foil to the component part and holding the mesh or foil in place. Because the thermoset resin is pliable at normal manufacturing temperatures, the lightning strike protection layer can relatively easily conform to the outer contour of the wing, fuselage, or other aircraft part being produced.

Recently, however, there has been a push to produce aircraft components from thermoplastic polymers because thermoplastic components exhibit certain advantages over thermoset components. For example, thermoplastic components may be more easily recycled than thermoset components, may exhibit increased strength as compared to thermoset components, and are less expensive and easier to produce because the parts can be heated and cooled repeatedly and produced rapidly without the need for autoclaves or other expensive equipment.

Thermoplastic component parts have certain drawbacks, however. For one, semi-crystalline thermoplastic composites have a very low surface energy and thus can be difficult to bond with primer or paint. Thus, in order to achieve sufficient paint adhesion for thermoplastic component parts, the outermost layer must be subjected to slow and expensive surface treatment such as plasma or corona etching to achieve a sufficient surface roughness or surface energy increase for paint adhesion. Similarly, to repair surface defects in thermoplastic parts, additional surface treatment (such as etching or similar) is necessary so that the filler may adequately bond to the defect.

Moreover, the low surface energy of the semi-crystalline thermoplastic parts makes it difficult for the secondary application of lightning strike protection to a thermoplastic skin in a durable fashion. That is, thermoplastic processing resins that are compatible for simultaneous melt processing with the composite parts are in the form of a film, which at ordinary manufacturing temperatures are not pliable and thus not drapable. In this regard, the film must be applied to the compound contours of the part being formed (fuselage, wing, etc.) in narrow strips. When applying a lightning strike protection in the form of a metallic mesh or foil or the like, each strip must form sufficient contact with the neighboring strip in order to ensure sufficient conductivity across the outer surface of the composite part. Any because such films do not have any tack at normal manufacturing temperatures, it is challenging to keep the narrow strips in place during application and processing.

Still more, the high processing (melt) temperature and crystalline content of advanced thermoplastic resins results in substantial shrinkage when they cool, especially for a resin rich area. This results in substantial residual tensile stress in the resin when processed with a low coefficient of thermal expansion (CTE) carbon fiber laminate that shrinks very little during cool-down. These stresses can result in cracking of the resin, especially when exposed to low temperatures. Furthermore, when complex thermoplastics structures are processed in production surface porosity and pitting often occur. Repairing these defects can be expensive, especially when they occur in lightning strike protected areas.

Thus, although it would be desirable to form certain composite parts from thermoplastic polymers, the difficulty in applying a sufficient surfacer, particularly in lightning strike protected areas, has limited the use of thermoplastic component parts in practice. Thus, there exists a need exists for an improved surfacer to be implemented on thermoplastic composite parts.

BRIEF SUMMARY OF THE INVENTION

At a high level, the present invention is directed to an improved surfacer to be used with thermoplastic component parts, and methods of producing the same. More particularly, embodiments of the invention are directed to a paintable surfacer for thermoplastic composite laminates with integral lightning strike protection mesh or foil that has drape and reinforced surface healing capability, and methods of producing the same.

For example, some embodiments of the invention are directed to a thermoplastic surfacer for providing lightning strike protection to a composite component of an aircraft. The thermoplastic surfacer includes a broadgood having a thermoplastic resin, one or more fillers embedded into the broadgood, and a lightning strike protection mesh or foil embedded into the broadgood.

Other embodiments of the invention are directed to a method of manufacturing a thermoplastic surfacer for providing lightning strike protection to a composite component of an aircraft. The method includes conveying a matrix resin fleece along one or more conveyor tables, with the matrix resin fleece including a broadgood having a thermoplastic resin embedded therein. The method also includes embedding one or more fillers into the matrix resin fleece and heating the matrix resin fleece until at least a portion of the thermoplastic resin reaches a melt temperature of the thermoplastic resin. Finally, the method includes embedding a lightning strike protection mesh or foil into the matrix resin fleece.

Still other embodiments of the invention are directed to a method of applying a thermoplastic surfacer to a composite part of an aircraft. The method includes draping a thermoplastic surfacer on an at least partially unconsolidated composite part, such as the thermoplastic surfacer discussed above or the thermoplastic surfacer produced by the method discussed above. The method further includes consolidating the at least partially unconsolidated composite part thereby forming a consolidated composite part by heating the at least partially unconsolidated composite part to a temperature at or above a melt temperature of a resin used in the at least partially unconsolidated composite part and at or above a melt temperature of the thermoplastic polymer resin of the thermoplastic surfacer. Finally, the method includes filling at least one surface defect in the consolidated part using the thermoplastic polymer resin and milled fibers provided in the thermoplastic surfacer.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Generally, aspects of the invention are directed to a thermoplastic surfacer that overcomes problems associated with using thermoplastic laminates as primary composite part structures, especially in areas where lightning strike protection is required. These and other features will be readily understood with reference to the figures.

Figure 1:
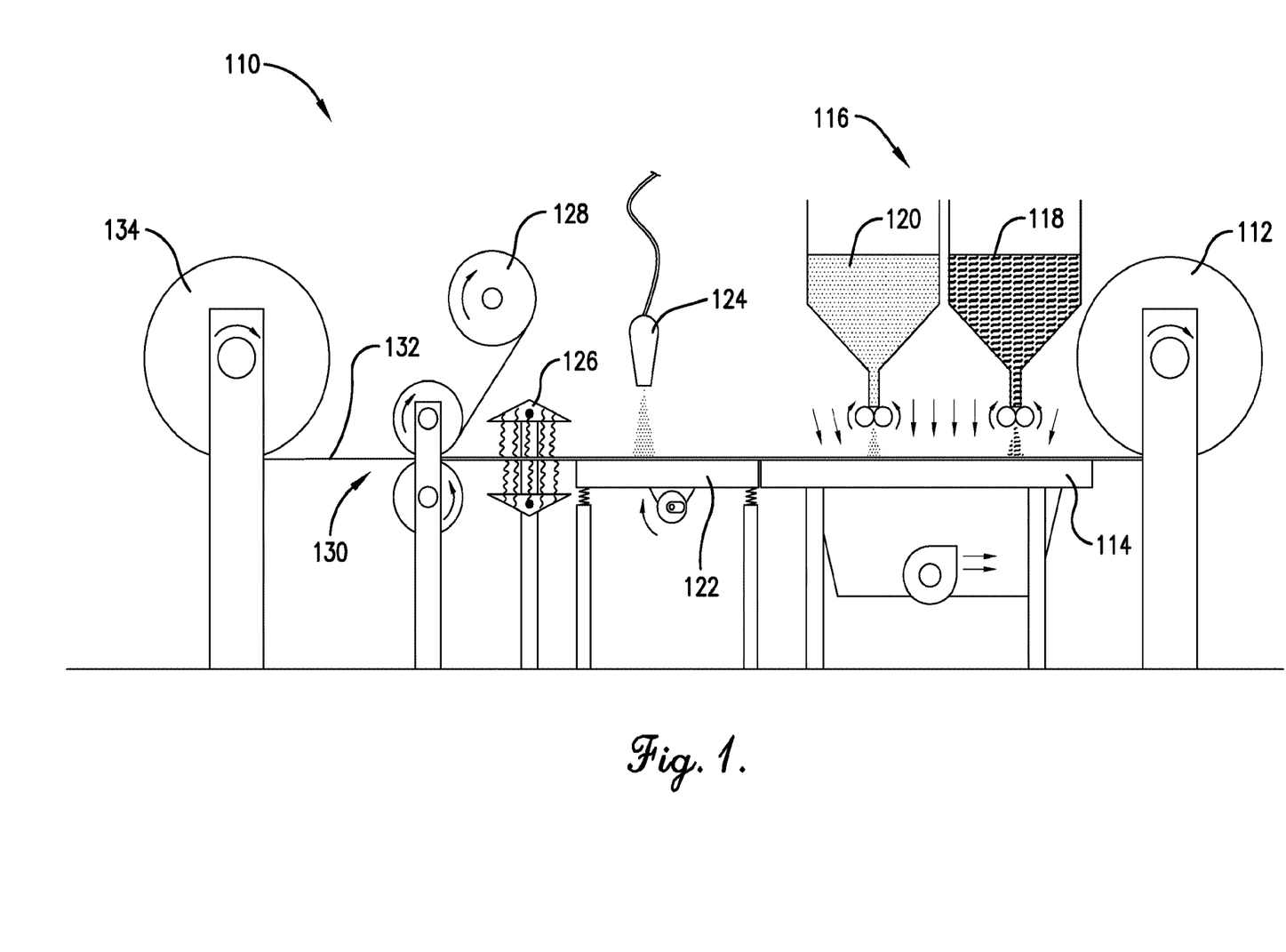
FIG. 1 is an elevation view of a first embodiment of tooling used to produce a thermoplastic surfacer according to aspects of the invention.

First, FIG. 1 shows tooling 110 used to manufacture a thermoplastic surface 132 according to a first embodiment of the invention. The tooling 110 includes a roll of matrix resin fleece 112 that is ultimately injected or impregnated with fillers 118, 120 and lightning strike protection mesh or foil 128 to form the drapable thermoplastic surfacer 132.

At a high level, the matrix resin fleece 112 is an amorphous polymer fleece that is similar in terms of drapability and pliability to a conventional blanket or coat-liner type material. More particularly, the matrix resin fleece 112 is an amorphous polymer filament felt made by distributing and entangling thermoplastic filaments into a wide broadgood—that is, a non-woven fabric made of thermoplastic filaments. Any suitable thermoplastic that exhibits amorphous behavior (as opposed to crystalline or semi-crystalline behavior) can be used as the thermoplastic filaments. These amorphous polymers include, without limitation, acrylonitrile butadiene styrene (ABS), polystyrene (PS), polycarbonate (PC), polysulfone (PSU), polyethersulfone (PES), polyphenylene sulfone (PPSU), and polyetherimide (PEI).

For example, one non-limiting example of a suitable matrix resin fleece is the backing material used by the Mitsubishi Chemical Corporation is its commercial PEI thermoplastic fleece product marketed under the trade name Kyron®Tex. The Kyron®Tex PEI product generally includes a matrix resin fleece material combined with various reinforcement fibers. Thus, in some embodiments the matrix resin fleece 112 may be the matrix resin fleece portion of the Kyron®Tex PEI product; that is, the matrix resin fleece 112 may be Kyron®Tex PEI without some or all of the reinforcement fibers. In other embodiments the matrix resin fleece 112 may be the Kyron®Tex PEI product in its entirety; that is the matrix resin fleece 112 could already have glass fibers embedded as is currently available from Mitsubishi.

Figure 5A:
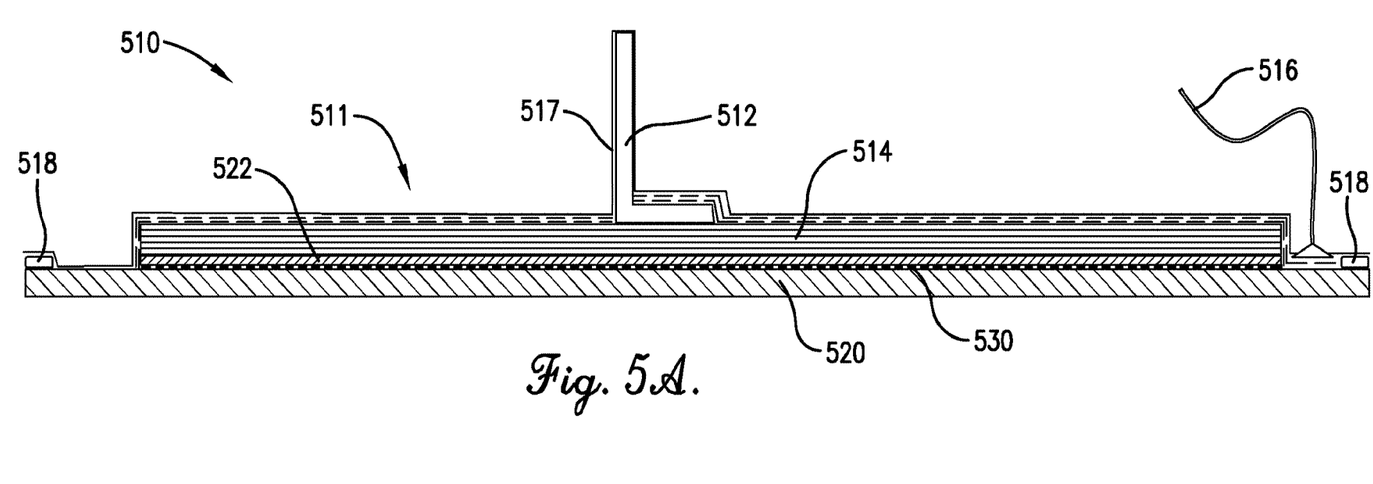
FIGS. 5A-5B are elevation views of consolidation tooling including a composite part having a thermoplastic surfacer according to aspects of the invention.
Figure 5B:
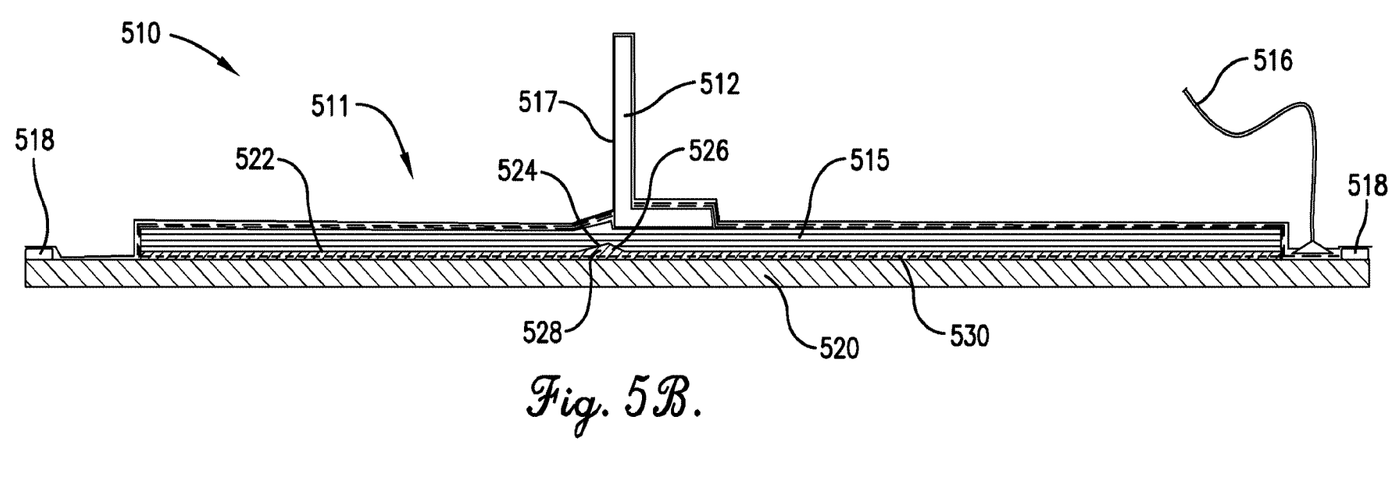

In some embodiments, the matrix resin fleece 112 will have a melt or handling temperature similar to the melt or handling temperature of the thermoplastic component part to which the surfacer 132 is ultimately be applied to assist with adhesion during processing steps such as during laminate consolidation, as will be discussed in more detail below in connection with FIGS. 5A, 5B, and 7. As shown in FIG. 1, the matrix resin fleece 112 may be provided about a roll and thus unrolled along various processing tables 114, 122 during manufacture of thermoplastic surfacer 132. However, in other embodiments the matrix resin fleece 112 may be provided in a different format such as discontinuous, flat sheets of fleece or otherwise without departing from the scope of the invention.

The tooling 110 shown in FIG. 1 includes various powder applicators 116 and tables 114, 122 used to apply any desired filler 118, 120 to the matrix resin fleece 112. The powder applicators 116 are configured to infiltrate the matrix resin fleece 112 with the milled fibers 118 and/or the fillers 120 when the matrix resin fleece 112 is dry and lofty. Namely, the tooling 110 includes an air table 114, a vibration table 122, and two powder applicators 116: a milled fiber 118 applicator and other filler 120 applicator. The milled fibers 118 may be any type of suitable fiber and in some embodiments may be milled carbon, graphite, and/or glass fibers. The addition of these short or milled fibers 118 can provide improved strength properties and can be easily dispersed into the fleece 112 while it is still lofty. The fillers 120 can provide reduced shrinkage, greater wear resistance, UV resistance, impact toughness, improved strength, higher modulus, improved sand-ability, reduced CTE, increased dielectric strength and other desirable properties. The fillers 120 can include nanoclay, talc, calcium carbonate, Kaolin, Wollastonite, mica and many other fillers widely used with polymers. In some embodiments the fillers 120 can also include nanotubes, nanonickel strands, and other highly conductive fillers to improve conductivity of the surfacer 132. These milled fibers 118 and/or other fillers 120 reduce the shrinkage of the surfacer 132 and provide greater resistance to any induced stresses during manufacture and use of the surfacer 132. Furthermore, the milled fibers 118 and/or other fillers 120 can be selected and loaded appropriately to provide electrical isolation between the lighting strike protection mesh or foil 128 and the laminate of the composite part to which the surfacer 132 is applied, thus enabling the use of aluminum mesh or foil on a carbon laminate that would otherwise require fiberglass isolation ply in the skin laminate to avoid corrosion caused by the galvanic reaction of aluminum and carbon.

The matrix resin fleece 112 is guided along the tables 114, 122 and impregnated with or otherwise combined with the milled fibers 118 and/or other fillers 120. More particularly, in the depicted embodiment the milled fibers 118 and fillers 120 are applied to a top surface of the matrix resin fleece 112 and embedded into the fleece 112 via a vacuum provided by the air table 114 drawing the fibers 118 and fillers 120 into the fleece. As the matrix resin fleece 112 (now impregnated with the fibers 118 and fillers 120) moves along the tooling 110, a vibration table 122 may further embed the fibers 118 and fillers 120 therein by vibrating the impregnated fleece 112, causing the fibers 118 and fillers 120 to more compactly settle therein. The tooling may also include a binder spray 124 either at one of the tables 114, 122 or else downstream thereof, which helps to adhere the fibers 118 and fillers 120 to the fleece 112 and ensures the fibers 118 and/or fillers 120 stay in place.

After the fleece 112 is provided with any milled fibers 118, other fillers 120, and binder spray 124—referred to herein as the "filler-laden" fleece 112—the filler-laden fleece 112 passes through heaters 126. The heaters 126 heat at least a portion of the resin in the filler-laden fleece 112 to a melting or softening point, such that the thermoplastic resin begins to melt and becomes more pliable. In some embodiments only a top surface of the resin (that is, a surface to which a lightning strike protection mesh or foil 128 is to be applied) in the filler-laden fleece 112 is heated to the melting point. In other embodiments, the resin is heated completely through its thickness (that is, the vertical dimension shown in FIG. 1) to the melting temperature. The heaters 126 also serve to dry or cure the binder spray 124 applied to the fleece 124.

A lightning strike protection mesh or foil 128 is then applied to an exposed (and melted) upward-facing side of the filler-laden fleece 112. The lightning strike protection mesh or foil 128 can be any metallic, and thus electrically conductive, mesh or foil known in the art. In embodiments in which the mesh or foil is aluminum and the fibers used in the laminate of the composite part to which the surfacer 132 is to be applied are carbon, it may be necessary to electrically isolate the mesh or foil 128 from the carbon fibers using the milled fibers 118, the other fillers 120, and/or a veil to reduce corrosion due to the galvanic reaction, which will be discussed in more detail below.

Finally, the filler-laden fleece 112 and lightning strike protection mesh or foil 128 combination is provided to a pair of calendaring rolls 130 which compress the lightning strike protection mesh or foil 128 into the heated, filler-laden fleece 112 forming the novel thermoplastic surfacer 132. At this point the matrix resin fleece 112 will be partially consolidated such that the mesh or foil 128 will be attached, but the resin will not be completely melted so that the right amount of drape remains while providing enough support so that the mesh or foil 128 is protected from handling damage.

Optionally, once cooled the thermoplastic surfacer 112 can be spooled onto a takeup roll 134 or similar for storage and/or transportation. In such embodiments, when ultimately applied to a composite part or the like, the surfacer 132 is simply spooled off of the takeup roll 134 and draped onto the composite part.

The thermoplastic surfacer 132 exhibits several advantages as compared to known surfacers and lightning strike protection processes. Because the lightning strike protection mesh or foil 128 is embedded into the matrix resin fleece 112, the mesh or foil 128 is protected during handling and when applying to a composite part. Put another way, the combination of the partially consolidated filled fleece 112 and lightning strike protection mesh or foil 128 (i.e., conductive foil) can provide drapability and prevents damaging the very fragile foil during handling. This prevents damage to the mesh or foil 128 that may otherwise occur using known manufacturing processes and thus increases the integrity of the lightning strike protection features.

Moreover, the thermoplastic surfacer 132 is drapable and thus can more readily conform to the complex outer contours of the composite part to which the surfacer 132 is being adjoined. Because known films are not drapable, they must be applied in strips when accommodating complex contours with each strip being adjoined to neighboring strips. This may result in gaps in the conductive mesh or foil and thus reduced lightning strike protection performance, defects formed at the intersection of adjoining strips, and time-consuming and expensive manufacturing processes.

Still more, because the resin of the thermoplastic surfacer 132 may have a melt temperature substantially similar to the thermoplastic composite part to which it is applied, the surfacer 132 may be easily melded with the composite part during manufacture by simply heating the components to the melt range and subsequently cooling. More particularly, the method of manufacturing the thermoplastic surfacer 132 would begin with a felt or fleece composed of an amorphous resin with a similar process temperature to that of composite laminate matrix being covered. Ideally the surfacer and the laminate would have substantial overlap in recommended process temperatures. For example, the recommended process temperature for Toray TC 1225 polyaryletherketone (PAEK) carbon prepreg is 608 to 720° F. and the Mitsubishi Chemical Kyron®Tex PEI has a recommended process temperature of 680 to 716° F. This overlap of processing temperatures allows the two to melt and diffuse together during laminate consolidation.

Still more, because the thermoplastic surfacer 132 is formed using an amorphous rather than semi-crystalline resin, the outer surface of the thermoplastic surface 132 exhibits increased paint adhesion characteristics as compared to the outer surface of thermoplastic component parts made from semi-crystalline resins. Paint, primer, and other substances used to fill surface pitting or defects adheres more readily to this amorphous resin as compared to semi-crystalline resins. Thus, primer, paint, and other finishing or defect-filling materials can be easily applied to a composite part outfitted with the thermoplastic surfacer 132 without necessitating additional processing steps such as etching or the like.

Figure 2:
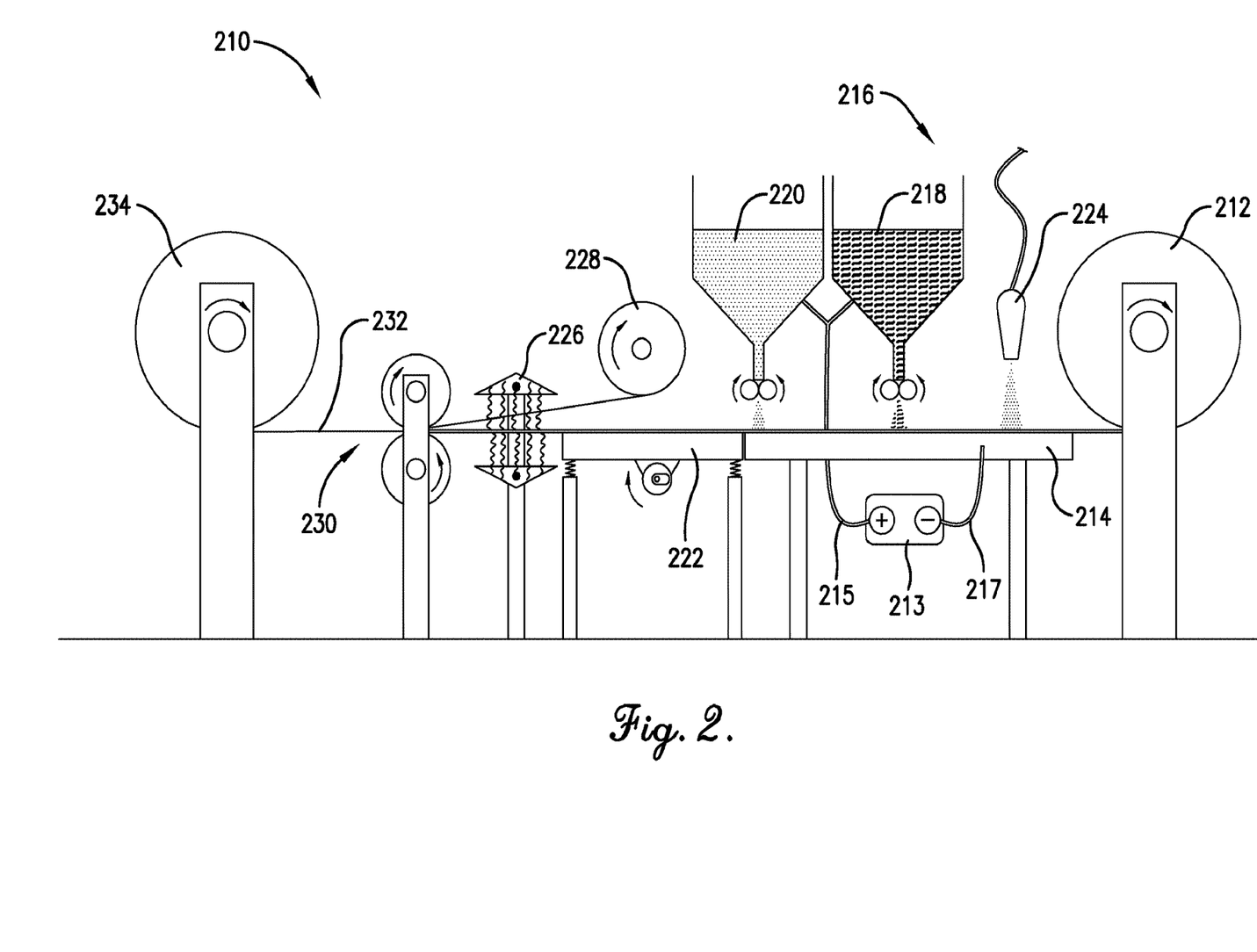
FIG. 2 is an elevation view of a second embodiment of tooling used to produce a thermoplastic surfacer according to aspects of the invention.

Although FIG. 1 depicts one embodiment of tooling 110 used to create one embodiment of a thermoplastic surfacer 132 according to aspect of the invention, other tooling and fillers can be employed resulting in alternative thermoplastic surfacers without departing from the scope of the invention. For example, FIG. 2 depicts alternative tooling 210 used to create a second thermoplastic surfacer 232 according to aspects of the invention. The tooling 210 includes a roll of matrix resin fleece 212, which is substantially similar to the matrix resin fleece 112 discussed in connection with tooling 110 and thus will not be discussed again in detail. The tooling also includes powder applicators 216 including a milled fiber 218 applicator and a filler 220 applicator, which are substantially similar to powder applicators 216 discussed in connection with tooling 110. Again, the two powder applicators 216 shown in FIG. 2 are for illustrative purposes only and in other embodiments either of the milled fiber 218 applicator or the filler 220 applicator may be eliminated from the tooling 220 and/or other powder applicators may be added to the tooling 220 depending on the application without departing from the scope of the invention. Moreover, although the tooling 220 includes a binder spray 224, which is substantially similar to the binder spray 124, in this embodiment the binder spray 224 is applied to the matrix resin fleece 112 prior to the milled fibers 218 and/or other fillers 220. However, in other embodiments the binder spray 224 may be applied to the matrix resin fleece 212 after the powder applicators 216 without departing from the scope of the invention.

In this embodiment, rather than implementing a vacuum assist table 114 to embed the milled fibers 218 and/or other fillers 220 into the matrix resin fleece 212, the tooling 210 uses an electrostatic table 214. The electrostatic table 214 includes an electricity source 213 having a positive lead 215 electrically connected to the powder applicators 216 in order to make the fillers 218, 220 positively charged and a negative lead 217 attached to a working surface of the table 214 to make the table 214 negatively charged. In this regard, the positively charged fillers 218, 220 will be attracted to the negatively charged table 214 and become embedded in the matrix resin fleece 212 passing therebetween. The tooling 210 may also include a vibration table 222 in order to more fully embed the fillers 218, 220 into the matrix resin fleece 212, which is substantially similar to the vibration table 122 discussed in connection with the tooling 110.

Similar to the filler-laden fleece 112 discussed above, the filler-laden fleece 212 (i.e., the matrix resin fleece 212 embedded with the milled fibers 218, other fillers 220, and/or binder spray 224) passes through heaters 226 in order to raise the temperature of the thermoplastic resin to a workability or melting point, and then combined with a lightning strike protection mesh or foil 228, which is substantially similar to the lightning strike protection mesh or foil 128 discussed above. In this embodiment, however, the lightning strike protection mesh or foil 228 is combined with the filler-laden fleece 212 prior to the fleece 212 entering the heaters 226. This in turn raises the temperature of both the fleece 212 and the mesh or foil 128 prior to the components being pressed together via calendaring rolls 230, which are substantially similar to calendaring rolls 130 discussed above. Heating the mesh or foil 128 in addition to the filler-laden fleece 212 may reduce stresses and thus defects that may otherwise be caused during cooling of the thermoplastic resin because the heated mesh or foil 228 also cools and thus contracts as the thermoplastic resin cools and contracts. Moreover, the elevated temperature of the mesh or foil 128 may provide for a better bond between the mesh or foil 128 and the fleece 112 during the calendaring process. However, in other embodiments the lightning strike protection mesh or foil 228 may be applied to the filler-laden fleece 212 after the fleece 212 passes through the heaters 226, in a similar manner as described in connection with tooling 110.

Once the calendaring rolls 230 press the lightning strike protection mesh or foil 228 into the filler-laden fleece 212 and the thermoplastic resin thereof cools, the thermoplastic surfacer 232 is fully formed. Optionally, the thermoplastic surfacer 232 may thereafter be taken up on a takeup roll 234 or similar for later application to a composite part such as a fuselage, wing, or similar component.

Figure 3:
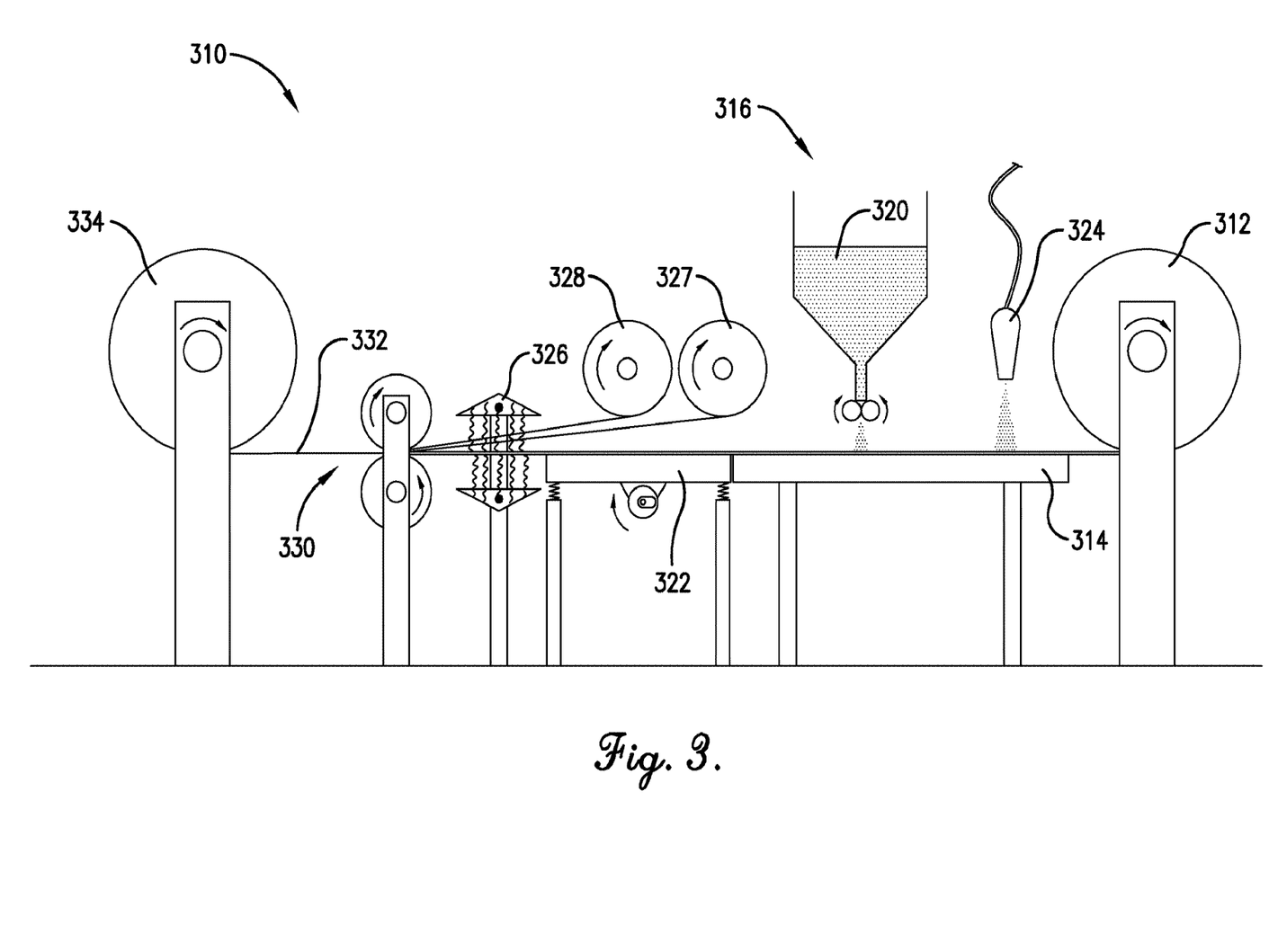
FIG. 3 is an elevation view of a third embodiment of tooling used to produce a thermoplastic surfacer according to aspects of the invention.

FIG. 3 shows tooling 310 used to form yet another embodiment of a thermoplastic surfacer 332 according to aspects of the invention. The tooling 310 generally includes a roll of matrix resin fleece 312, a binder spray 324, a vibration table 322, a lightning strike protection mesh or foil 328, heaters 326, and calendaring rolls 330, which are substantially similar to the matrix resin fleece 112, 212, binder spray 124, 224, vibration table 122, 222, lightning strike protection mesh or foil 128, 228, heaters 126, 226 and calendaring rolls 130, 230, respectively, discussed above and thus will not be discussed in detail. In this embodiment, only one powder applicator 316 is shown—namely, a filler 320 applicator—but in other embodiments additional applicators 316 could be utilized without departing from the scope of the invention including a milled fiber applicator (such as the milled fiber 118, 218 applicators, discussed above). Moreover, as with tooling 210, in the depicted embodiment the binder spray 324 is applied to the matrix resin fleece 312 prior to the powder applicators 316 but in other embodiments the binder spray 324 could be applied to the fleece 312 after the powder applicators 316 without departing from the scope of the invention. Still more, the tooling 310 implements a roller table 314 followed by the vibration table 322, with the latter most effectively embedding the fillers into the matrix resin fleece 312. However, in other embodiments additional tables or processes may be employed to embed any fillers more effectively into the matrix resin fleece 312 including vacuum assisted tables such as air table 114 and/or electrostatic table such as electrostatic table 214.

In this embodiment, the thermoplastic surfacer 332 includes a veil 327 between the lightning strike protection mesh or foil 328 and filler-laden fleece 312. The veil 327 may be a layer of glass or light fabric or the like used for galvanic isolation when the lightning strike protection mesh or foil 328 is comprised of aluminum in order to reduce or eliminate corrosion of the mesh or foil 328 that might otherwise occur due to a galvanic reaction between the mesh or foil 328 and the carbon fibers provided in the thermoplastic composite part to which the thermoplastic surfacer 332 is ultimately applied. In embodiments in which the veil 327 is utilized the milled fibers 118, 218 may be eliminated, as shown in FIG. 3, or else the veil 327 may be provided in addition to the milled fibers 118, 218. In some embodiments the veil 327 may be implemented even if the mesh or foil 328 is not aluminum and/or the fibers of the composite part are not carbon and therefore there is not a concern of a galvanic reaction, but the veil 327 is nonetheless used in place of the milled fibers 118, 218 or the like for rigidity or other purposes.

The veil 327 is spooled onto the matrix resin fleece 312 prior to the lightning strike protection mesh or foil 328 in order to provide an ultimate electric barrier between the mesh or foil 328 and the carbon fibers. Although in the depicted embodiment the veil 327 and the mesh or foil 328 are spooled onto the filler-laden fleece 312 prior to the heaters 326, in other embodiments one or both of the veil 327 and the lightning strike protection mesh or foil 328 may be spooled onto the filler-laden fleece 312 after the fleece 312 has passed through the heaters 326. Finally, the veil 327 and mesh or foil 328 are thereafter compressed into the heated fleece 312 via the calendaring rolls 330 forming the thermoplastic surfacer 332, and optionally spooled onto a takeup roll 334 for later use, as discussed.

In some embodiments, the width of the lightning strike protection mesh or foil 128, 228, 328 being applied to the filler-laden fleece 112, 212, 312 may be smaller than or equal to the width of the filler-laden fleece 112, 212, 312. As used herein, "length" refers to the substantially continuous dimension of the fleece 112, 212, 312 as is comes off the roll (corresponding to the horizontal direction as viewed in FIGS. 1-4), while "width" refers to the greater of the two dimensions of the fleece 112, 212, 312 perpendicular to the length (corresponding to the vertical direction as viewed in FIG. 4 and a direction perpendicular to the horizontal direction and vertical direction in FIGS. 1-3). However, in other embodiments the width of the lightning strike protection mesh or foil 128, 228, 328 may be greater than the width of the filer-laden fleece 112, 212, 312 in order to increase electrical continuity between neighboring lengths of surfacer 132, 232 when applied to a composite part in an lightning strike zone.

Figure 4:
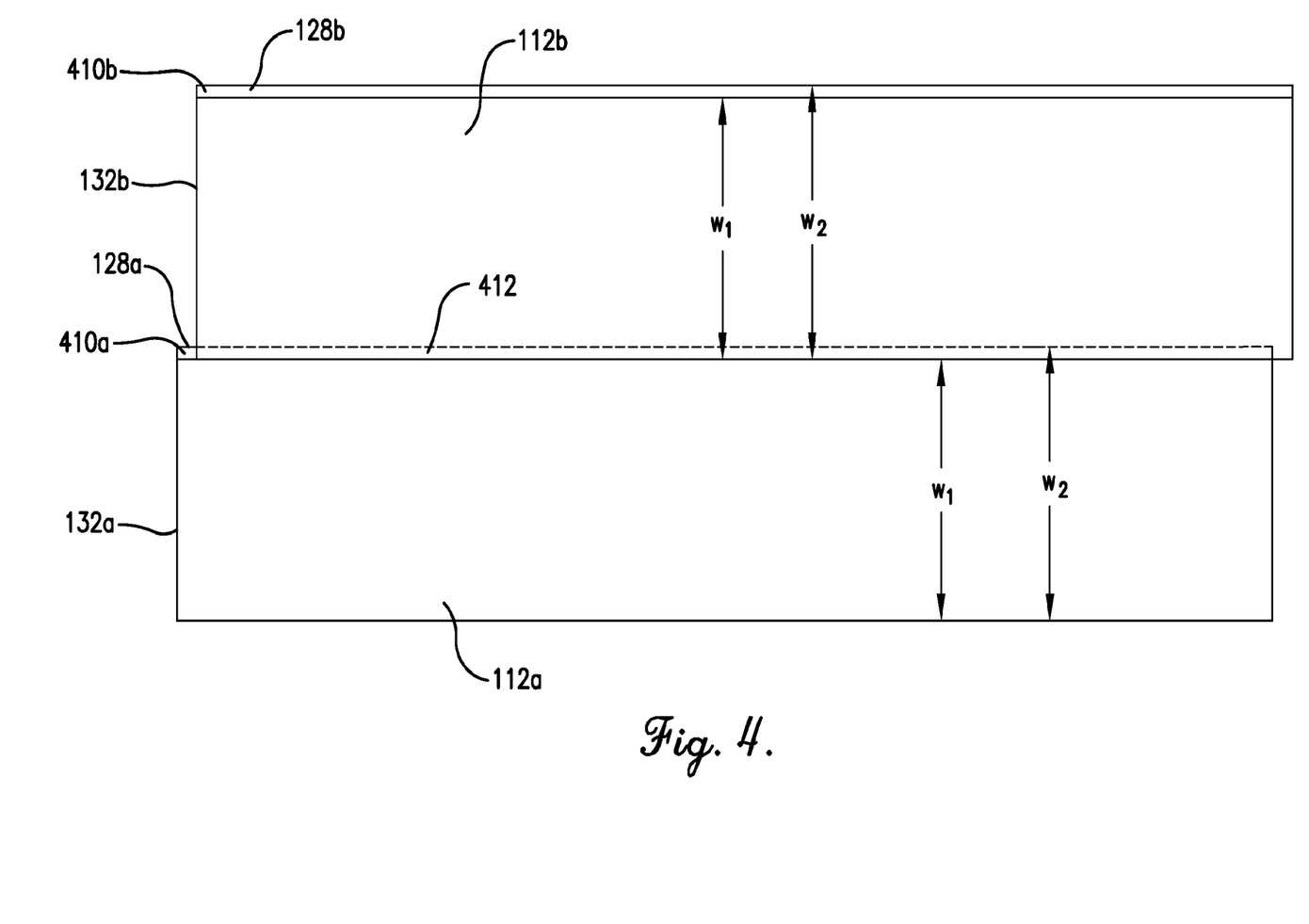
FIG. 4 is a plan view of two passes of a thermoplastic surfacer according to an aspects of the invention.

This may be more readily understood with reference to FIG. 4, which is a plan view of two lengths of the thermoplastic surfacer 132a, 132b discussed in connection with FIG. 1. Although for simplicity the following discussion is made in view of surfacer 132, the other embodiments of the thermoplastic surfacer discussed herein including the surfacers 232, 332 could similarly include lightning strike protection mesh or foil 228, 328 having a width greater than the fleece 212, 312 to which the mesh or foil 228, 328 is being applied in order to achieve similar conductivity benefits.

The thermoplastic surfacers 132a, 132b each include a filler-laden fleece 112a, 112b having a first width, $w_1$, and a lightning strike protection mesh or foil 128a, 128b having a second width, $w_2$, which is greater than $w_1$. Because $w_2$ is greater than $w_1$, the mesh or foil 128 overhangs the fleece 112 forming a mesh or foil overhang 410a, 410b. When the thermoplastic surfacers 132a, 132b are applied to a composite part or the like such that the adjacent passes of the fleece 112a, 112b abut each other, the mesh or foil overhang 410a of the first surfacer 132a overlaps the second surfacer 132b forming an overlapping region 412. Put another way, the protruding mesh or foil 128a on one edge of the first surfacer 132a can be covered by the next pass of the second surfacer 132b, creating direct electrical contact between the rows of the thermoplastic surfacer 132a, 132b. In this regard, there is no threat of a residual gap being formed in the mesh or foil 128 when the surfacer 132 is applied to a composite part in strips. More particularly, the lightning strike protection mesh or foil 128a of the first surfacer 132a forms a electric bond with the lightning strike protection mesh or foil 128b of the second surfacer 132b due to the overlap 412, ensuring electrical continuity between the surfacers 132a, 132b. Thus, when present in a potential lightning strike zone on an aircraft of the like, the overlapping mesh or foils 128a, 128b ensure that any lightning strike is effectively routed across the surface of the aircraft from an entry point to an exit point without damaging the composite skin of the aircraft that may otherwise occur if there is a break between successive mesh or foils.

Applying a thermoplastic surfacer made in accordance with aspects of the invention such as the surfacers 132, 232, or 332 or similar may beneficially provide automatic defect filling during consolidation of a lightning strike protected part. This may be more readily understood with reference to FIGS. 5A and 5B. These figures generally show consolidation tooling 510 using to consolidate a composite part 511 made from multiple plies of thermoplastic resin and fiber fillers. Prior to consolidation, which is depicted in FIG. 5A, the composite part 511 generally includes a pre-consolidated stiffener 512 and unconsolidated laminate 514, which includes multiple plies of fiber and thermoplastic resin. The composite part 511 also includes a thermoplastic surfacer 522 (which may be the thermoplastic surfacer 132, 232, or 332 or similar) applied to an outer-facing surface of the unconsolidated laminate 514; that is, a surface of the composite part 511 that will ultimately face outwardly and thus be painted, be vulnerable to lightning strikes, etc. The surfacer 522 in laid upon a consolidation tool 520 such as a table or the like, and the entire part is covered with a vacuum bag 517. The vacuum bag 517 is generally a plastic sheet or the like and is configured to cover the composite part 511 during consolidation in an airtight manner. In this regard, a sealant tape 518 or similar may be provided around the open edges of the vacuum bag 517 forming an airtight seal.

During consolidation, the composite part 511 is heated while a negative pressure (i.e., vacuum) is applied to the vacuum bag 517 via a vacuum 516. As the air is removed from the vacuum bag 517, the vacuum bag 517 exerts pressure on the unconsolidated laminate 514 forcing it to compress, or consolidate, after which the composite part 511 is ready for painting and/or assembly into the aircraft.

Because the stiffener 512 is preconsolidated, however, it does not further compress during the consolidation process. And because the laminate portion 514, 515 thus shrinks during consolidation while the stiffener does not, sometimes defects can form in the composite part 511 during the consolidation process, such as a vacuum bag induced defect 524 shown in FIG. 5B, or other defects such as surface pits or grooves.

Traditionally, these defects must be filled or otherwise repaired following the consolidation process, which can be time-consuming. However, the surfacer 522 made according to aspects of the invention may serve to self-fill these defects, resulting in a smooth outer surface of the composite part 511 without further finishing and defect repair. More particularly, during the consolidation process resin from the surfacer 522 flows from an area of high pressure to any areas of low pressure and thus into any defects such as the vacuum bag induced defect 524, forming a resin pocket 526 that fills the void and otherwise prevents a noticeable defect on the outer surface of the consolidated laminate 515. Moreover, the resin pocket 526 will include fillers and fibers 528 (such as, e.g., the milled fibers 118, 218 or other fillers 120, 220, 320) thereby reducing shrinkage of the resin pocket 526, reducing residual tensile stresses in the resin pocket 526, and otherwise providing increased tensile strength and crack resistance to the resin pocket 526. Still more, because the resin and any fillers and fibers 528 included therein fills the defect 524, the lightning strike protection mesh or foil 530 of the surfacer 522 does not get pulled into the defect. This eliminates possible damage to the mesh or foil 530 that may otherwise occur if the resin did not fill the defect 524.

Figure 6:
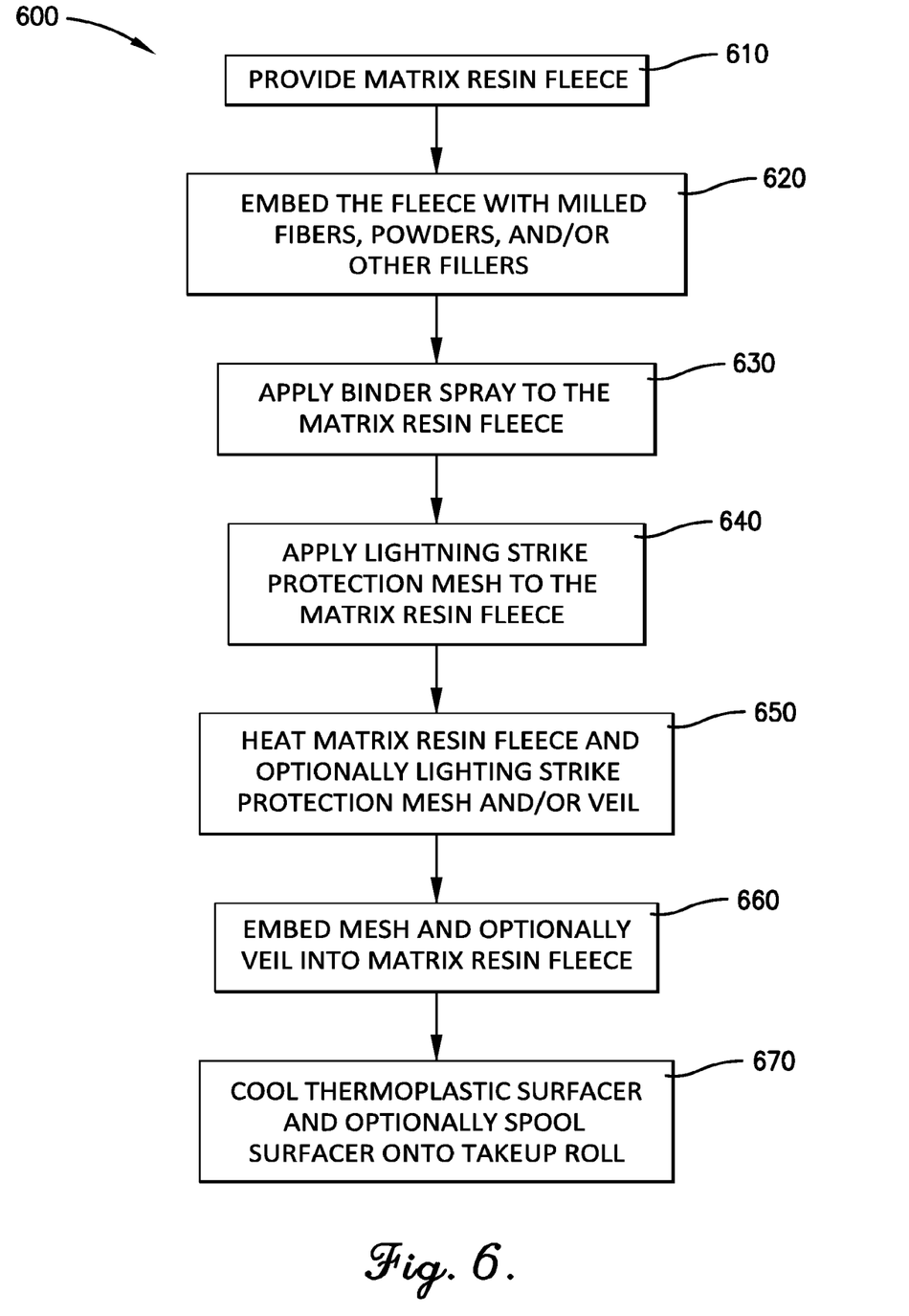
FIG. 6 is a flowchart depicting a method of manufacturing a thermoplastic surfacer according to aspects of the invention.

FIG. 6 is a flowchart of an exemplary method 600 of manufacturing a thermoplastic surfacer such as surfacers 132, 232, or 332 according to aspects of the invention. First at step 610 a matrix resin fleece is provided. As should be appreciated from the above discussion, the matrix resin fleece is a wide broadgood or felt including a suitable amorphous thermoplastic resin including, without limitation, ABS, PS, PC, PSU, PES, PPSU, and PEI.

At step 620 the matrix resin fleece is embedded with any desired fillers such as milled fibers or the like via one more powder applicators such as applicators 116, 216, 316. These fillers can include, but are not limited to, nano clay, talc, calcium carbonate, Kaolin, Wollastonite, mica, other fillers widely used with polymers, nanotubes, nanonickel strands, highly conductive fillers, and milled fibers such as glass, carbon, or other suitable fibers. Moreover, optionally a vacuum assist table, electrostatic table, vibration table, and/or other electronically or mechanically controlled tooling can be used at step 620 to assist embedding the fibers into the matrix resin fleece.

At step 630 a binder spray is applied to the matrix resin fleece. As should be appreciated from the above discussion in connection with FIGS. 1-3, in some embodiments the binder spray is applied to the matrix resin fleece after the addition of any desired fillers or milled fibers, while in other embodiments the binder spray may be applied prior to the addition of any desired fillers or milled fibers.

At step 640 a lightning strike protection mesh or foil is applied to the filler-laden matrix resin fleece. This may be any lightning strike protection mesh or foil typically used in lightning strike zones on an aircraft fuselage or wings or the like. In embodiment in which carbon fibers are used in the composite part to which the surfacer is to be applied, a veil may also be applied at step 640. In such embodiments the veil is placed between the lightning strike protection mesh or foil and the filler-laden fleece in order to mitigate corrosion due to the galvanic reaction between the metallic mesh or foil and the carbon fibers. Moreover, and as discussed in connection with FIG. 4, the mesh or foil and optional veil may be wider than the matrix resin fleece to which the mesh or foil is being applied so that the mesh or foil overhangs the fleece and overlaps the mesh or foil of neighboring surfacer components when ultimately applied to a composite part or the like ensuring conductivity between the multiple lengths of surfacers.

At step 650 the filler-laden mesh or foil is heated so that at least the surface of fleece reaches the melt temperature. Optionally, the matrix resin fleece can be heated throughout such that all of the thermoplastic resin reaches the melt temperature. Moreover, in some embodiments the filler-laden fleece is heated prior to the addition of the lightning strike protection mesh or foil and optional veil (that is, in some embodiments step 650 is performed prior to step 640), while in other embodiments the lightning strike protection mesh or foil and optional veil are applied to the filler-laden mesh or foil and optional mesh or foil prior to the heating step such that the mesh or foil, optional veil, and filler-laden fleece are all heated at step 650.

At step 660 the lightning strike protection mesh or foil and optional veil are compressed into the filler-laden fleece such as by, without limitation, calendaring the lightning strike protection mesh or foil and optional veil into the filler-laden fleece as discussed above. Once fully cooled, the surfacer is complete and ready for applying to a composite thermoplastic part. Optionally, the completed thermoplastic surfacer can be spooled onto a takeup spool such as spool 134, 234, 334 for storage or transportation.

Figure 7:
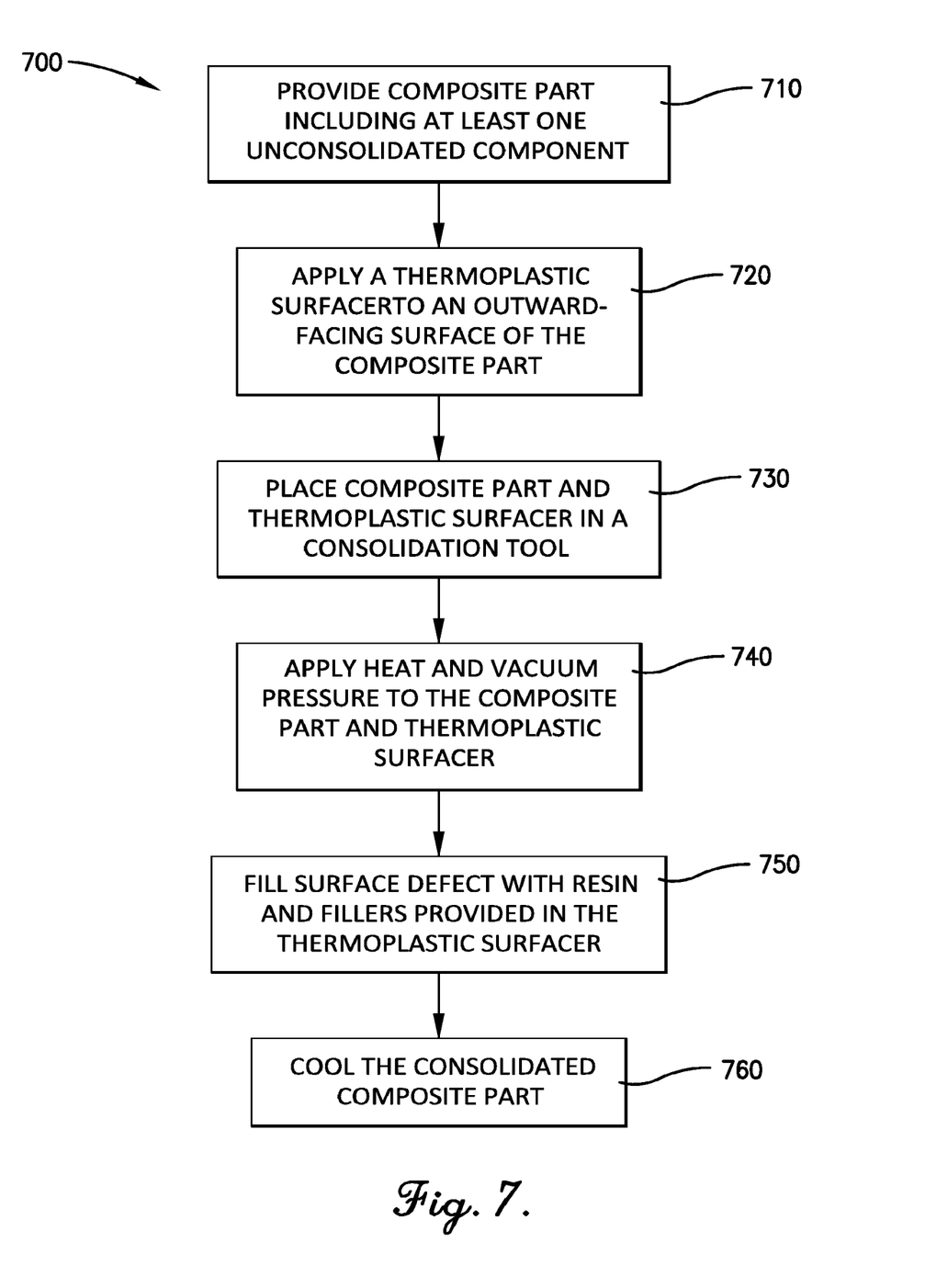
FIG. 7 is a flowchart depicting a method of applying a thermoplastic surfacer to a composite part according to aspects of the invention.

FIG. 7 is a flowchart of an exemplary method 700 of applying a thermoplastic surfacer such as surfacers 132, 232, or 332 to a composite part such as composite part 511 according to aspects of the invention. At step 710 a composite part with at least one unconsolidated component is provided. The composite part includes multiple layers, or plies, of a fiber encased in a thermoplastic resin.

At step 720 a thermoplastic surfacer such as the thermoplastic surfacer 132, 232, 332 discussed above is applied to an outer-facing surface of the composite part. Again, the thermoplastic surfacer is drapable and thus can seamlessly be applied to the thermoplastic composite part notwithstanding any complex contours of the part. In some embodiments the thermoplastic surfacer is applied piecewise to a large composite part, with each length of surfacer abutting a neighboring surfacer. In embodiments in which the lightning strike protection mesh or foil overhangs the edge of the matrix resin fleece such as the embodiments shown in FIG. 4 above, at step 720 the overhanging mesh or foil is overlaid on a neighboring length of surfacer forming an overlap of lightning strike protection mesh or foil such as the overhang 412.

At step 730 the composite part with surfacer applied thereto is placed in a consolidation tool. In some embodiments, this may include placing the outward-facing surface of the part (that is, the surface of the part containing the surfacer) against a similarly contoured consolidation tool and placing a vacuum bag around the part. In some embodiments, open edges of the vacuum bag may be sealed to the consolidation tool using a sealant tape or the like forming an airtight seal.

At step 740 the unconsolidated portion of the composite part is consolidated by applying heat and/or a negative pressure to the composite part. For example, a vacuum may be used to remove the air from the inside of the bag and thus apply a pressure to the unconsolidated part while the part is heated to a melting temperature of the thermoplastic resin used in the composite part and/or the surfacer. As discussed in connection with FIGS. 5A and 5B, in some instances the consolidation process may form a defect on the outer surface of the composite part such as, by way of example, the vacuum bag induced defect 524 shown in FIG. 5.

At step 750, any defects that are formed in the outer-facing surface of the composite part can be self-filled during the consolidation process by the thermoplastic surfacer. More particularly, resin from the surfacer flows into the defect forming a resin pocket such as surfacer resin pocket 526 discussed above, thereby filling and repairing the defect. Moreover, in embodiments in which the surfacer includes milled fibers or other fillers, the milled fibers and/or fillers flow into the resin pocket with the thermoplastic resin thus providing increased strength to the otherwise resin-rich area.

Finally, at step 760 the composite part is cooled and is then ready for assembly onto an aircraft of the like. Optionally, the composite part with the surfacer thereon is painted at step 760. As discussed, because the surfacers created according to aspects of the invention include increased paint adhesion properties as compared to known thermoplastic component parts due to the use of an amorphous thermoplastic resin, the finished composite part can be primed and painted at step 760 without requiring the slow and expensive surface treatment processed such as plasma or corona etching to achieve a sufficient surface roughness for paint adhesion.

Although the invention has been described with reference to the embodiments illustrated in the attached drawings, it is noted that equivalents may be employed without departing from the scope of the invention as recited in the claims.

What is claimed is:

1. A method of manufacturing a thermoplastic surfacer for providing lightning strike protection to a composite component of an aircraft, the method comprising:
    conveying a matrix resin fleece along one or more conveyor tables, the matrix resin fleece comprising a broadgood having a thermoplastic resin embedded therein;
    embedding one or more fillers into the matrix resin fleece;
    heating the matrix resin fleece until at least a portion of the thermoplastic resin reaches a melt temperature of the thermoplastic resin; and
    embedding a lightning strike protection mesh or foil into the matrix resin fleece.

2. The method of claim 1 further comprising applying a binder spray to the matrix resin fleece, the binder spray configured to adhere the one or more fillers to the matrix resin fleece.

3. The method of claim 2, wherein the binder spray is applied to the matrix resin fleece prior to the step of embedding the one or more fillers into the matrix resin fleece.

4. The method of claim 2, wherein the binder spray is applied to the matrix resin fleece after the step of embedding the one or more fillers into the matrix resin fleece.

5. The method of claim 1, wherein the thermoplastic resin is one of acrylonitrile butadiene styrene (ABS), polystyrene (PS), polycarbonate (PC), polysulfone (PSU), polyethersulfone (PES), polyphenylene sulfone (PPSU), and polyetherimide (PEI).

6. The method of claim 1, wherein the broadgood is composed of thermoplastic fibers in the form of a drapable nonwoven fleece.

7. The method of claim 1, wherein the step of embedding the one or more fillers into the matrix resin fleece includes embedding at least one of milled carbon fibers, milled graphite fibers, milled glass fibers, nanoclay, talc, calcium carbonate, Kaolin, Wollastonite, mica, nanotubes, or nanonickel strands into the matrix resin fleece.

8. The method of claim 1, wherein the step of embedding the one or more fillers into the matrix resin fleece includes using at least one of a vacuum assisted table, an electrostatic table, or a vibration table to embed the one or more fillers into the matrix resin fleece.

9. The method of claim 1, wherein the step of embedding the lightning strike protection mesh or foil into the matrix resin fleece includes calendering the lightning strike protection mesh or foil into the matrix resin fleece.

10. The method of claim 1 further comprising embedding a veil into the matrix resin fleece.

11. The method of claim 1 further comprising heating the lightning strike protection mesh or foil prior to the step of embedding the lightning strike protection mesh or foil into the matrix resin fleece.

12. The method of claim 1 further comprising cooling the matrix resin fleece with the lightning strike protection mesh embedded therein and spooling the thermoplastic surfacer onto a takeup roll.

13. A method of applying a thermoplastic surfacer to a composite part of an aircraft, the method comprising:
    draping a thermoplastic surfacer on an at least partially unconsolidated composite part, the thermoplastic surfacer including a broadgood including a thermoplastic resin, milled fibers embedded into the broadgood, and a lightning strike protection mesh or foil embedded into the broadgood;
    consolidating the at least partially unconsolidated composite part thereby forming a consolidated composite part by heating the at least partially unconsolidated composite part to a temperature at or above a melt temperature of a resin used in the at least partially unconsolidated composite part and at or above a melt temperature of the thermoplastic polymer resin of the thermoplastic surfacer; and
    filling at least one surface defect in the consolidated part using the thermoplastic resin and milled fibers provided in the thermoplastic surfacer.

14. The method of claim 13 further comprising surrounding the at least partially unconsolidated composite part and the thermoplastic surfacer with a vacuum bag and applying a vacuum pressure to the at least partially unconsolidated composite part and the thermoplastic surfacer.

15. A thermoplastic surfacer for providing lightning strike protection to a composite component of an aircraft, the thermoplastic surfacer comprising:
    a broadgood including a thermoplastic resin;
    one or more fillers embedded into the broadgood; and
    a lightning strike protection mesh or foil embedded into the broadgood.

16. The thermoplastic surfacer of claim 15, wherein the broadgood is composed of thermoplastic fibers in the form of a drapable nonwoven fleece or felt.

17. The thermoplastic surfacer of claim 15, wherein the one or more fillers include at least one of milled glass fibers, milled graphite fibers, milled carbon fibers, nanoclay, talc, calcium carbonate, Kaolin, Wollastonite, mica, nanotubes, or nanonickel strands.

18. The thermoplastic surfacer of claim 15, wherein the thermoplastic resin is one of acrylonitrile butadiene styrene (ABS), polystyrene (PS), polycarbonate (PC), polysulfone (PSU), polyethersulfone (PES), polyphenylene sulfone (PPSU), and polyetherimide (PEI).

19. The thermoplastic surfacer of claim 15 further comprising a binder spray configured to bind the one or more fillers to the broadgood.

20. The thermoplastic surfacer of claim 15 further comprising a veil abutting the lightning strike protection mesh or foil.

\* \* \* \* \*